US006795638B1

(12) United States Patent
Skelley, Jr.

(10) Patent No.: US 6,795,638 B1
(45) Date of Patent: Sep. 21, 2004

(54) SYSTEM AND METHOD FOR RECORDING AND PREPARING STATISTICS CONCERNING LIVE PERFORMANCES

(75) Inventor: John F. Skelley, Jr., Oakland, NJ (US)

(73) Assignee: New Jersey Devils, LLC, East Rutherford, NJ (US)

( * ) Notice: Subject to any disclaimer, the term of this patent is extended or adjusted under 35 U.S.C. 154(b) by 956 days.

(21) Appl. No.: 09/676,874

(22) Filed: Sep. 29, 2000

Related U.S. Application Data

(60) Provisional application No. 60/156,862, filed on Sep. 30, 1999.

(51) Int. Cl.[7] ............................. H04N 5/93; G11B 27/00
(52) U.S. Cl. ............................................. 386/52; 386/55
(58) Field of Search ............................... 386/52, 55, 46, 386/83, 94, 95, 124, 125, 45, 1, 4, 68, 69, 70, 67, 6, 40; 725/53, 52, 15, 133, 141; 348/157; 345/719, 723; 707/7, 102, 104.1; H04N 5/93; G11B 27/00

(56) References Cited

U.S. PATENT DOCUMENTS

| | | | | |
|---|---|---|---|---|
| 5,065,251 A | | 11/1991 | Shuhart | ...................... 358/335 |
| 6,424,789 B1 | * | 7/2002 | Abdel-Mottaleb | ........... 386/52 |
| 6,631,522 B1 | * | 10/2003 | Erdelyi | ........................ 725/53 |
| 2001/0034734 A1 | * | 10/2001 | Whitley et al. | .......... 707/104.1 |

OTHER PUBLICATIONS

Specification sheet for AG–VC205 Video–Computer Interface by Panasonic, Division of Matsushita Electric Corporation of America.

* cited by examiner

Primary Examiner—Robert Chevalier
(74) Attorney, Agent, or Firm—Lerner, David, Littenberg, Krumholz & Mentlik, LLP

(57) ABSTRACT

A system and method of using a computer for creating video clips of activities occurring during a performance, such as a sporting event, are provided. A computer is used for controlling a first video recorder to prepare a video recording of the performance. A database associated with the computer also is created for storing information regarding events occurring during the performance. A plurality of pre-defined events that may occur during the performance are recognized by this database. Using a mouse, keyboard or other computer input device, an operator identifies the occurrence of a pre-defined event during the performance. A corresponding signal is transmitted to the database identifying the location on the video recording where the activity corresponding to the pre-defined event is recorded. Using the computer to control a second video recorder, a series of clips, and associated data regarding the clips, are recorded from the first video recording and database onto a second video recording.

52 Claims, 11 Drawing Sheets

SYSTEM AND METHOD FOR RECORDING AND PREPARING STATISTICS CONCERNING LIVE PERFORMANCES

CROSS REFERENCE TO RELATED APPLICATIONS

The present application claims the benefit of U.S. Provisional Patent Application No. 60/156,862 filed on Sep. 30, 1999, the disclosure of which is incorporated herein by reference.

TECHNICAL FIELD

This invention relates to the creation of audiovisual recordings of live performances. In particular, this invention relates to the creation of, and the preparation of statistics on, live performances, particularly entertainment and sporting events.

BACKGROUND OF THE INVENTION

Live performances, particularly entertainment and sporting events such as basketball, baseball, wrestling, boxing, soccer and hockey, to name but a few, often are recorded on audiovisual media. Teams involved in sporting events also create segments or highlights, i.e., short clips, of these recordings for purposes of analysis, training and coaching, as well as for promotion. Apparatuses for creating audiovisual clips are known. Such apparatuses consist, however, of complex, often specialized, audiovisual equipment. This equipment, while effective, is expensive and difficult to use.

Sports teams also create detailed statistics of sporting events for purposes of analysis, training and coaching. These statistics can be created during the game or by watching an audiovisual recording of the game.

There is a need, however, for a system and method for creating audiovisual clips from a performance, such as a sporting event, and for creating a corresponding statistical database relating to these clips, which is uncomplicated, user-friendly and uses relatively inexpensive equipment.

SUMMARY OF THE INVENTION

In one aspect, the present invention provides a method for creating video clips of activities occurring during a performance, and creating a corresponding database of information relating to the video clips. In accordance with the invention, a first video recording of the performance is prepared. A database associated with the computer also is prepared. The database includes characterizations of pre-defined events describing activities that may occur during the performance. Input indicia are assigned to each of these pre-defined events for an operator's selection of the event's occurrence during the performance. In response to the selection of one of these input indicia, first data identifying the occurrence of the event are transmitted to the computer. Also, in response to such selection, second data identifying the segment of the first video recording where the activity corresponding to the event is recorded also are transmitted to the computer. The first data and the second data then are correlated in the database, and the segments from the first video recording are copied to a second video recording. The first and second video recordings preferably are analog video tape recordings. In an alternative embodiment, the first video recording is a digital recording and the second video recording is an analog video tape recording.

The invention also preferably includes playing the first video recording in a playback device, displaying the performance on a video monitor in response to this playing and selecting the input indicia for each of the pre-defined events during the displaying of the performance on this video monitor. The invention also preferably includes controlling this playback device from the computer.

In a further preferred embodiment, the invention preferably includes also controlling from the computer a recorder for recording the segments from the first video recording onto the second video recording.

In another aspect, the present invention provides a system for creating video clips of activities occurring during a performance, and creating a corresponding database associated with a computer of information relating to the video clips. The system includes a playback device for playing a first video recording of the performance. The system also includes means for establishing in the database for recognition by the computer a plurality of pre-defined events, each of these pre-defined events corresponding to one of a plurality of activities that may occur during the performance. Means for assigning user-selectable indicia to each of these pre-defined events also are provided. The system further includes means for selecting the user-selectable indicia corresponding to an activity of the plurality of activities upon the occurrence of the activity during the performance.

The system also includes means for storing in the database, in response to selecting the user-selectable indicia corresponding to an activity, first data identifying the corresponding event. The system also includes means for storing in the database, in response to this selecting, second data identifying the segment of the first video recording where the activity is recorded and a pre-determined starting point and ending point of the segment. A recording device for copying the segment from the first video recording onto a second video recording also is provided.

The playback device preferably comprises an analog video tape recorder, and the first video recording preferably is an analog tape. In an alternative embodiment, the playback device is a digital recorder, and the first video recording is a digital recording. The system also preferably includes a video monitor for displaying the performance during playing of the first video recording.

The system also preferably includes a monitor associated with the computer for displaying the user-selectable indicia corresponding to each of the pre-defined events and a mouse for selecting the user-selectable indicia. The system also preferably includes means for transmitting a plurality of control signals from the computer to control the playback device and recording device and means for displaying a plurality of user-selectable control buttons on the monitor for selecting these signals.

The system also preferably includes means for recording alphanumeric data from the database onto the second video recording. These data preferably include a title for each of the events corresponding to the activities recorded on the second video recording.

The system and method of the invention are particularly applicable to performances involving games.

DETAILED DESCRIPTION OF THE PREFERRED EMBODIMENTS

Figure 1:
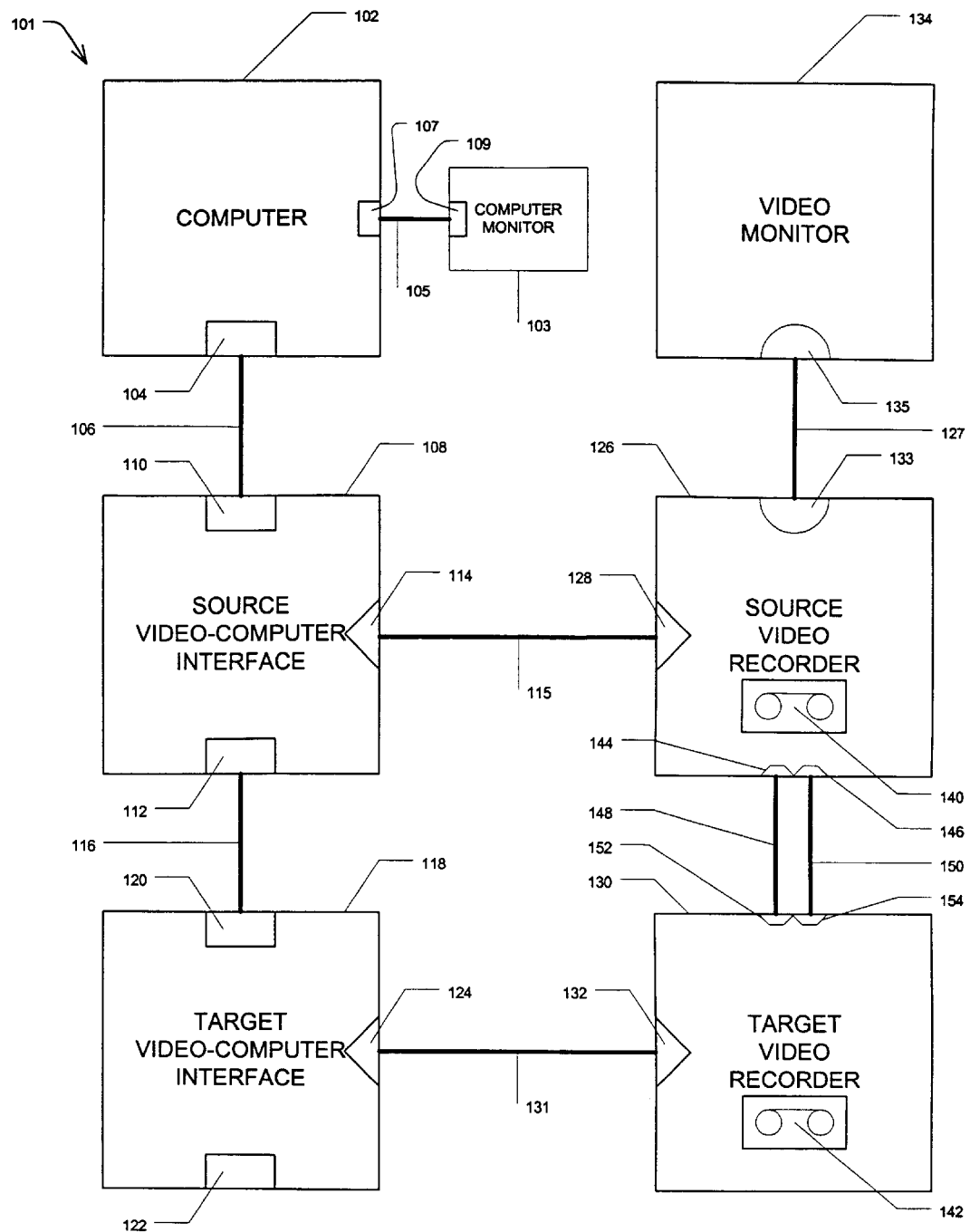
FIG. 1 is a block diagram of a system in accordance with the present invention.

A system 101 constructed in accordance with the present invention is shown in FIG. 1. The components of system 101 include computer 102 with signal ports 104 and 107; computer monitor 103 with signal port 109; source video-computer interface 108 with signal ports 110 and 112 and edit port 114; target video-computer interface 118 with signal ports 120 and 122 and edit port 124; source video tape recorder (source VTR) 126 with edit port 128 and signal port 133; target video tape recorder (target VTR) 130 with edit port 132; and video monitor 134 with signal port 135. Source VTR 126 and target VTR 130 record audiovisual signals on, and play back audiovisual signals from, source video cassette tape 140 and target video cassette tape 142, respectively.

The components of system 101 are connected as shown in FIG. 1. As shown in this figure, signal port 104 of computer 102 is connected to signal port 110 of source video-computer interface 108 via connector 106. Signal port 107 of computer 102 is connected to signal port 109 of computer monitor 103 via connector 105. Signal port 112 of source video-computer interface 108 is connected to signal port 120 of target video-computer interface 118 via connector 116. Edit port 114 of source video-computer interface 108 is connected to edit port 128 of source VTR 126 via connector 115. Signal port 133 of source VTR 126 is connected to signal port 135 of video monitor 134 via connector 127. Edit port 132 of target VTR 130 is connected to edit port 124 of target video-computer interface 118 via connector 131. Output port 144 of source VTR 126 is connected to input port 152 of target VTR 130 via connector 148. Input port 146 of source VTR 126 is connected to output port 154 of target VTR 130.

In a preferred embodiment, computer 102 is an IBM PC-compatible computer with at least an i486 CPU running the Windows 3.1 operating system. Computer 102 can employ other CPUs, however, and run other operating systems, e.g., Windows 95, Windows 98, Windows 2000 or Windows NT. Computer 102 also could be any general purpose computer, such as an Apple Macintosh computer or a Unix workstation. Computer 102 also could be a microprocessor or special purpose digital computer. In the preferred embodiment, VTRs 126 and 130 are Panasonic AG-1960/AG-1970/AG-1980 VTRs. VTRs 126 and 130, however, can be any video tape recorders capable of interfacing with video-computer interfaces 108 and 118. In the alternative, VTRs 126 and 130 may be record/playback devices using other audiovisual storage media, such as digital tape decks, rewriteable DVDs, hard-disk recorders and rewriteable CD drives. In a preferred embodiment, computer 102 also includes, in addition to VTRs 126 and 130, a recordable CD-ROM and drive (not shown) as an optional mechanism for recording audiovisual data. Also, although computer monitor 103 and video monitor 134 are shown as separate monitors, a single monitor may be used to perform the functions of both of these monitors.

In the preferred embodiment, source video computer interface 108 and target video-computer interface 118 are Panasonic AG-VC205 video-computer interfaces. Video-computer interfaces 108 and 118 can be, however, any systems capable of providing control of VTRs 126 and 130 in response to commands from a digital computer.

Signal ports 104, 110, 112, 120 and 122 are RS232 serial ports (specifically DB25 connector ports), and connectors 106 and 116 are RS232 serial connectors. Edit ports 114, 124, 128 and 132 are 5-pin transistor-to-transistor logic (TTL) ports. Signal ports 133 and 135 are conventional plugs for the receipt of coaxial cable connectors, and signal ports 107 and 109 are conventional ports for the transmission of video signals between a computer and a computer monitor.

Signal port 122 provides system 101 with the capability of adding additional video-computer interfaces daisy-chained onto system 101. If video-computer interfaces 108 and 118 are Panasonic AG-VC205 video-computer interfaces, over one hundred additional interfaces, and video recorders controlled by these interfaces, may be daisy-chained onto system 101 and controlled by computer 102.

In the operation of system 101, computer 102 issues commands in response to an operator's input on a keyboard, mouse or other computer input device (not shown). A display of appropriate commands on monitor 103, described in greater detail below, facilitates this process. Video-computer interfaces 108 and 118 translate these commands into commands to which VTRs 126 and 130 can respond. Using computer 102, therefore, an operator can control VTRs 126 and 130 simply by selecting (clicking on) commands displayed on monitor 103 (command buttons) or depressing a key on a keyboard associated with these commands (e.g., start, stop, play, rewind, fast forward, etc.). A representative screen display of command buttons is shown in block 908 of FIG. 9.

In the further operation of system 101, the operator plays video cassette tape 140 on VTR 126. Video cassette tape 140 contains a source recording of a previously recorded live performance, e.g., a sports game such as a hockey game, baseball game, football game, boxing match or other sporting event. This recording is displayed to the operator, in a conventional manner, on video monitor 134. In the alternative, computer 102 and computer monitor 103 can be configured to display this recording in a window of computer monitor 103. Also, in lieu of watching a recording of the performance, the operator can watch the actual performance live or watch on video monitor 134 or computer monitor 103 a live or taped broadcast of the performance while VTR 126 simultaneously records the performance on video cassette tape 140.

While watching the performance, the operator, using a database application program running on computer 102, identifies and characterizes selected events occurring during the performance. To do so, the operator transmits signals to computer 102 from a keyboard, mouse or other computer input device (not shown). These signals characterize the nature of, and provide information about, each event. To facilitate this step, as discussed in greater detail below, certain events are pre-defined in computer 102, and the operator indicates the occurrence of a pre-defined event using only a single click of the mouse or a depression of one or more keys on the keyboard. Indicia identifying the pre-defined events (event buttons) are displayed on computer monitor 103. A representative screen display of event buttons is shown in block 904 of FIG. 9. A preferred database application program for this purpose is Foxpro 2.6 for Windows. However, other database application programs also are suitable.

In response to the operator's input signals, source video-computer interface 108 provides computer 102 signals identifying the time of the selected event's occurrence with respect to the real time counter of source VTR 126. This time is measured against a predetermined point on source video cassette tape 140 e.g., the point of initiation of the recording. Computer 102 reads the real time counter at this initiation point. The application program enters this timing information into a database created for the events. The application program also automatically designates a predetermined segment of time surrounding each event's occurrence to define the event's starting time and the event's ending time. Depending upon the event's nature, these times may vary automatically or be varied manually. As discussed below, these times also may be varied by the operator upon later review of the sequence of clips identified on the source recording.

Since no two individual VTRs have the exact same motor speeds and speeds of playing and recording, VTRs 126 and 130 are calibrated periodically, and their respective motor speeds are entered in the computer's database. Using this information, the application program compensates for any speed differentials in the VTRs in calculating start times and stop times for the events.

The pre-defined events for a particular performance depend upon the nature of the performance. For example, for a hockey game, the pre-defined events may be a goal, shot on goal, trap, face off, board play, scoring chance, power play, hit, etc. A pre-defined event also may be characterized as a special event. A special event is any undefined occurrence during the performance which the operator elects to record as a clip. Each event is entered into the event database with a start time, stop time, event type, event ID number, data specific to the particular event and any notes of the operator. Data regarding the event also can be fed directly into the database from another source (e.g., statistics from the NHL's website or those generated by the NHL in real time during a game).

Upon completion of the operator's selection of clips and events (by monitoring video cassette tape 140, the live performance or a broadcast of the performance), the event database for the performance is created. This database comprises, among other data, a list identifying each event and the position on source video cassette tape 140 where the clip associated with that event is recorded. A representative sample of such a list is shown at block 902 of FIG. 9. The positional data include a start time and a stop time for each event. The database fields for each event can be edited as necessary, sorted and selected by a variety of indicia, such as event type, players involved in the event, etc. Using computer 102, VTR 126 can be fast forwarded from clip to clip, in any selected order, to facilitate this process.

Upon completion of the selection and editing of events and associated video clips, computer 102 can be instructed to cause VTRs 126 and 130 to record in any selected order a selected sequence of the clips from source video cassette tape 140 onto target video cassette tape 142. In doing so, the operator may instruct computer 102 to copy some of the data from the event database onto target video cassette tape 142 for alphanumeric display. The target recording of clips and statistics can be viewed by, e.g., players, coaches, etc. Copies of target video cassette tape 142 also can be made inexpensively for distribution to individuals for later viewing using, e.g., their home VCRs.

Using the event database and any associated database, the operator of system 101 also may generate reports of statistics compiled for the performance, including a list of the events identified. These reports may be printed in hard copies for distribution with copies of the target video tapes. Images of these reports also may be reproduced on the target video tape.

Figure 2:
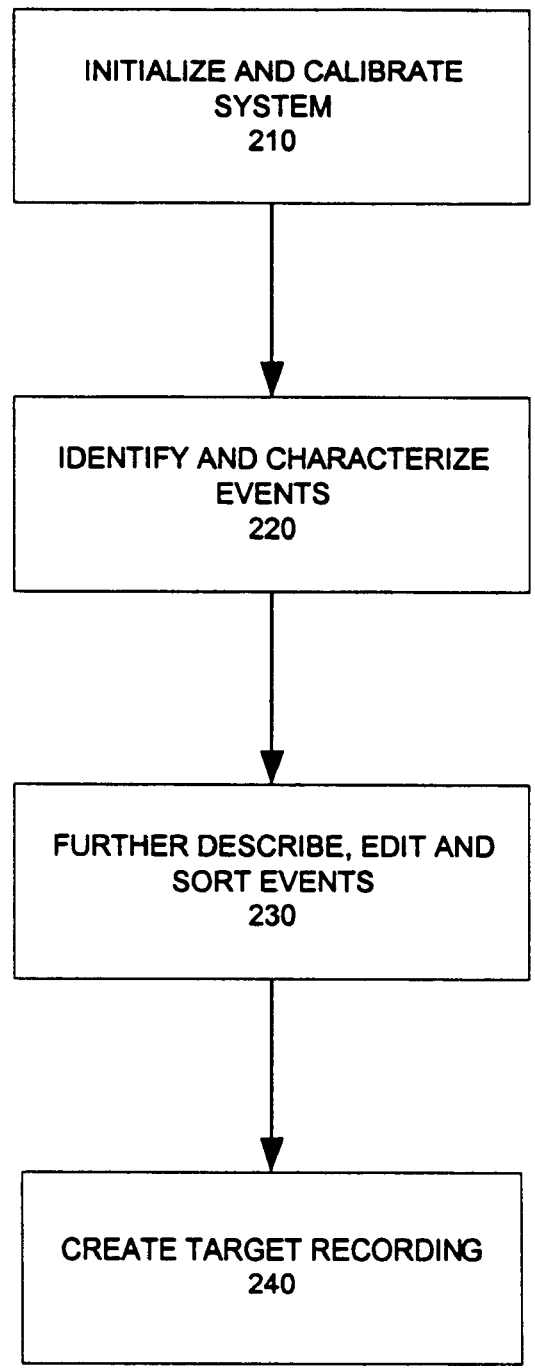
FIG. 2 is a flow diagram of the overall operation of the system.

FIG. 2 is a flow diagram of the overall steps for creating a target recording of video clips for a particular performance. In step 210, system 101 is initiated and calibrated. The steps for initiation and calibration are described below in connection with FIG. 3. In step 220, a live performance, or a source recording of a live performance, is viewed by an operator, and, using system 101, the selected events of the performance are identified and characterized. In step 230, the database of events, and the clips on the source recording, are reviewed, edited and sorted into a preferred sequence. In doing so, the operator may modify the length of each clip and add additional information for the corresponding event into the event database. In step 240, the selected sequence of clips, and selected information from the event database associated with the clips, are recorded onto the target recording.

Figure 3:
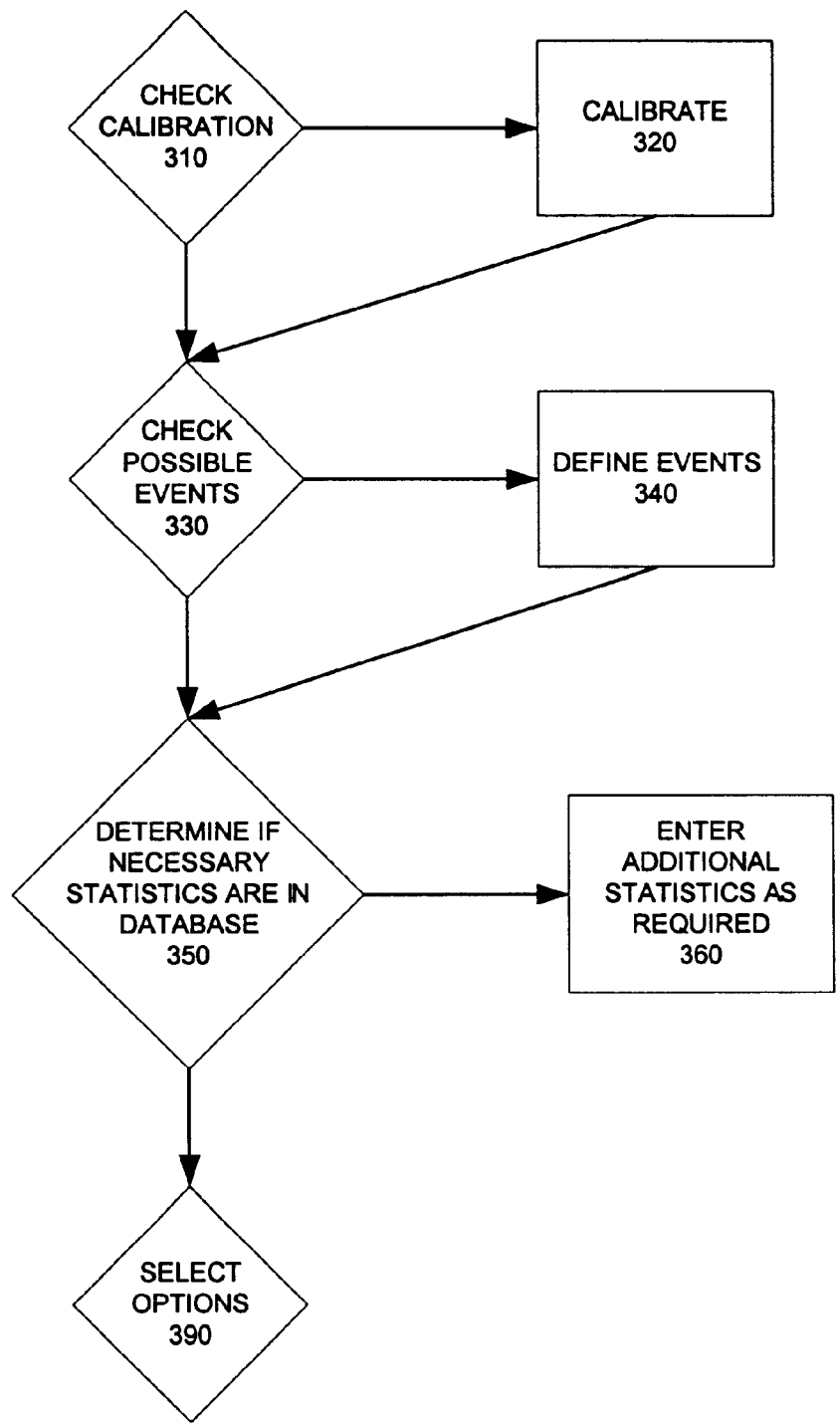
FIG. 3 is a flow diagram of the steps for preparing the system for operation.

A flowchart of the steps for initiating and calibrating system 101 is shown in FIG. 3. In step 310, the operator determines the calibration status of source VTR 126 and target VTR 130. If these VTRs are not calibrated, then the operator advances the application program to step 320. In step 320, the motor speed of each VTR is calibrated against the VTR's real time counter. This calibration provides computer 102 a precise correlation between this real time counter and the length of tape advanced during a fixed number of counts of this counter.

Figure 6:
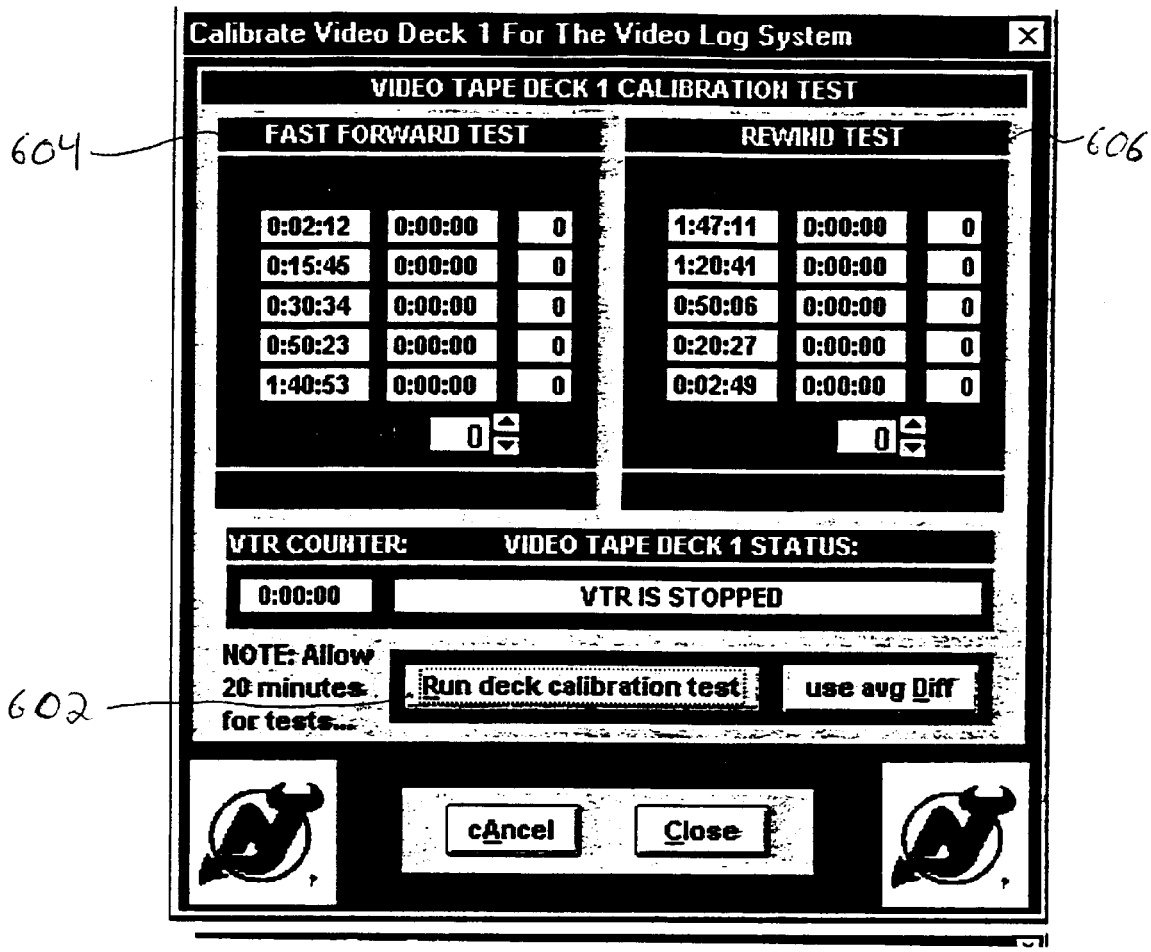
FIG. 6 is a display of a screen for calibrating the system.

FIG. 6 is a display of a screen for use in calibrating system 101. Calibration button 602 initiates a calibration test for a VTR of system 101. Fast forward test block 604 indicates the variances in time for a series of predetermined fast forwarding plays of the VTR. Rewind test block 606 indicates the variances in times for a series of predetermined rewinding plays of the VTR. These variances are used to arrive at a calibration number for the VTR's motor.

In step 330, the operator checks to determine whether all necessary pre-defined events recognizable by the application program for the performance exist in the database. For example, for a football game, the pre-defined events may be a variety of offensive plays, defensive positions, scoring opportunities, touchdowns and field goals. Each of these events is correlated with one or more keys of the keyboard of computer 102 or a single mouse-click position (button) appearing on computer monitor 103. A special event, i.e., an undefined occurrence relating to the performance for which the operator elects to record a clip and a corresponding event, also is defined.

Figure 7:
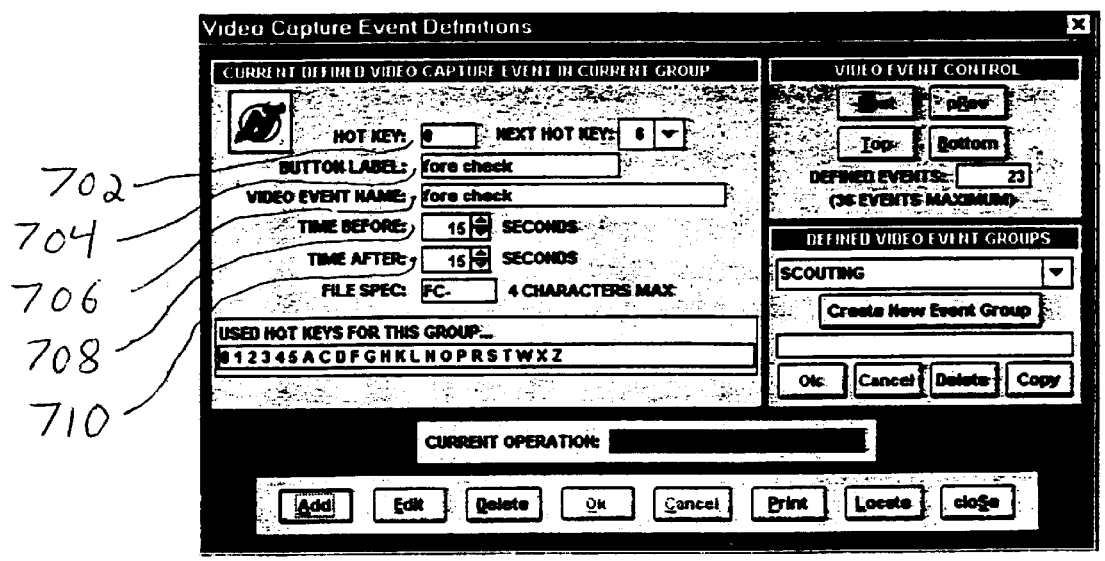
FIG. 7 is a display of a screen for specifying additional pre-defined events in the system.

If all required event types for the performance are not defined, then the operator advances the application program to step 340 where the application program is provided a characterization and identifying indicia (e.g., a particular key on the keyboard or mouse-click button) for additional pre-defined events. An example of a screen display for characterizing and identifying additional pre-defined events, where the performance is a hockey game, is shown in FIG. 7. As shown in this figure, various data fields may be defined for an event. Field 702 enables the operator to define a "hot key" for the event, i.e., a key on the computer's keyboard for indicating the event's occurrence during the performance. Label field 704 enables the operator to label a corresponding button appearing on computer monitor 103 for also indicating the event's occurrence with a mouse click. Event name field 706 enables the operator to assign a name to the event. Time before field 708 enables the operator to specify the amount of time before pressing the hot key for the event, or clicking on the button for the event, for designating the clip's start time. Time after field 710 enables the operator to specify the amount of time after pressing the hot key for the event, or clicking on the button for the event, for designating the clip's stop time. These start and stop times are set individually for each type of event recognized by the database.

When all necessary events are defined, then the operator advances the program to step 350 where a determination is made whether all necessary statistics regarding the performance are available in the database. For a sporting event, for example, these statistics may include team rosters, player IDs, player positions, player names, game data, etc. If all necessary statistics are not available, such statistics may be, e.g., downloaded from a worldwide web site or other data sources. In the alternative, the additional information may be entered by hand.

Figure 8:
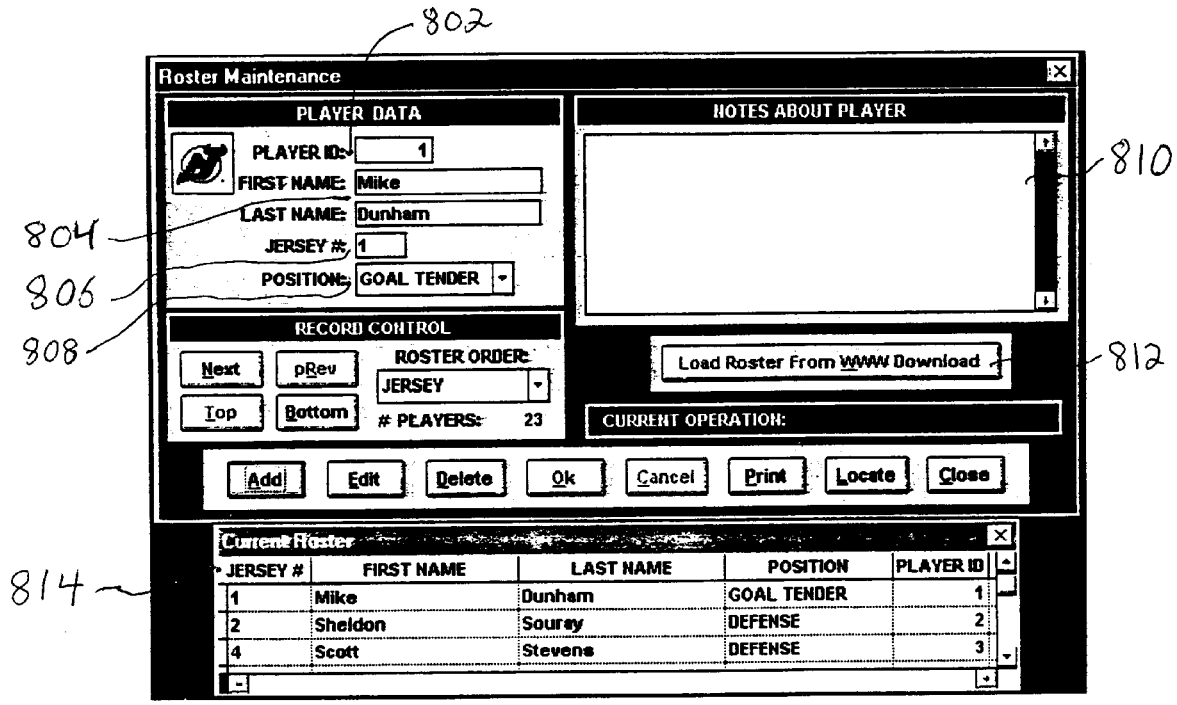
FIG. 8 is a display of a screen of the system for adding additional information concerning a performance.

An example of a screen display for adding additional information into the event database for a hockey game performance is shown in FIG. 8. The player ID field 802 shown in this figure automatically designates an ID number for a player. In name field 803, the operator enters a player's name to correspond with this ID number. In number field 806, the player's jersey number for this player ID number is entered. In position field 808, the operator enters the position of the player corresponding to this ID number. The operator then enters any notes about the player in notes field 810. Button 812 enables the operator to download a team roster from the World Wide Web. Table 814 lists the team roster for the game.

The operator then advances the program to step 390 where options are selected. These options include whether video clips of the events of the performance will be recorded on target video cassette tape 142. A database of events for a performance may be created without also creating a tape of video clips associated with that database. The options also include, e.g., whether to record text titles and other information on the target video tape in association with the selected clips.

Figure 4:
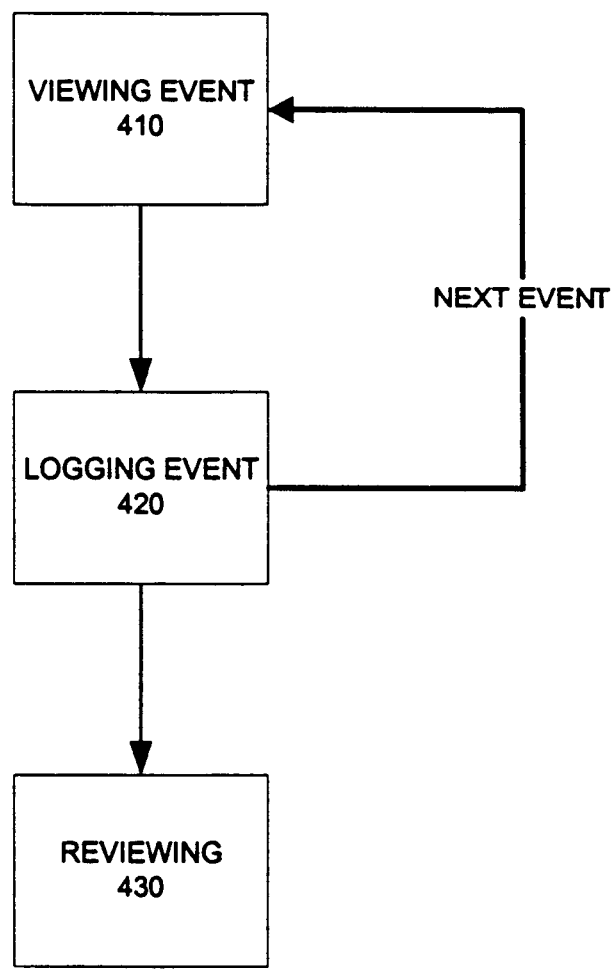
FIG. 4 is a flow diagram of the steps for operating the system for identifying events during the viewing of a performance.

FIG. 4 is a flowchart of the steps for identifying events occurring during the viewing of a performance. In step 410, the operator views the performance on video monitor 134, either from a live broadcast or by playing source video cassette tape 140. Upon viewing an action corresponding to a pre-determined event, the operator, at step 420, enters into computer 102 indicia identifying that event (e.g., presses one or more keys on the keyboard or clicks on an appropriate button appearing on computer monitor 103). In response, the application program, using information from source video-computer interface 108, records in the event database the start and stop times for the event. Using the additional information for the performance entered into the event database, as described above in connection with FIG. 8, the operator also can enter additional data for the event at this time or can do so later upon reviewing the selected clips from the source recording. The entry of these additional data is discussed below in connection with FIG. 10. Step 420 is repeated through the entirety of the performance until all of the events for the performance are entered into the event database. At step 430, viewing of the performance is completed.

Figure 9:
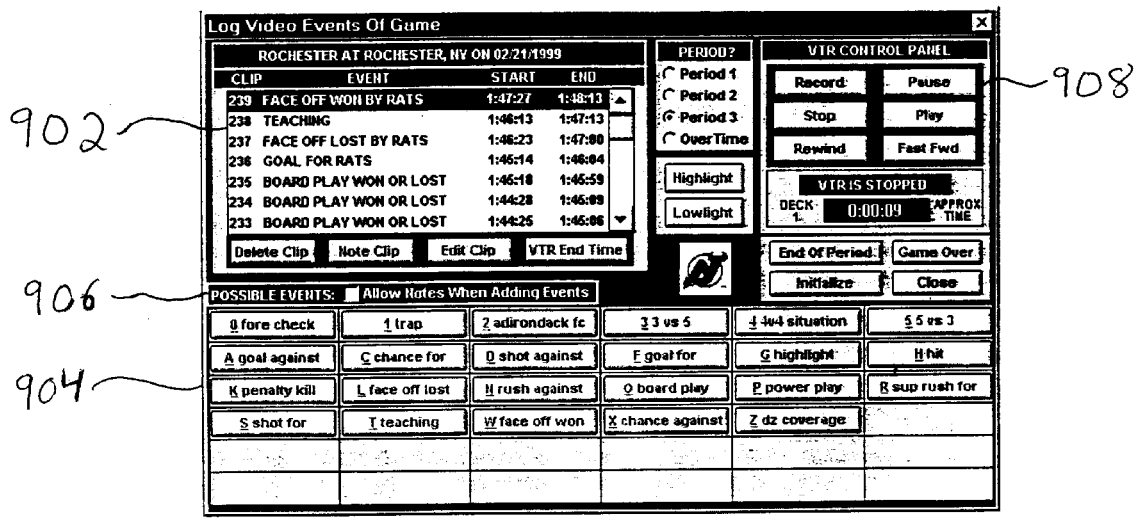
FIG. 9 is a display of a screen of the system for identifying events occurring during a performance.

An example of a screen display for identifying events occurring during a hockey game performance is shown in FIG. 9. As shown in this figure, event table 902 lists the events previously identified for the performance. Button grid 904 contains up to thirty-six (36) buttons corresponding to the pre-defined events for the performance. For this particular performance, twenty-three (23) of these buttons are used. Each used button contains an event name preceded by a Hot Key designation. Box 906 enables the operator to select whether notes regarding an event can be added into the database by the operator. Control panel 908 provides control buttons for controlling VTR 126 during recording or playback of the performance. These buttons include buttons for the conventional VTR operations, viz., record, stop, rewind, pause, play and fast forward.

Figure 5:
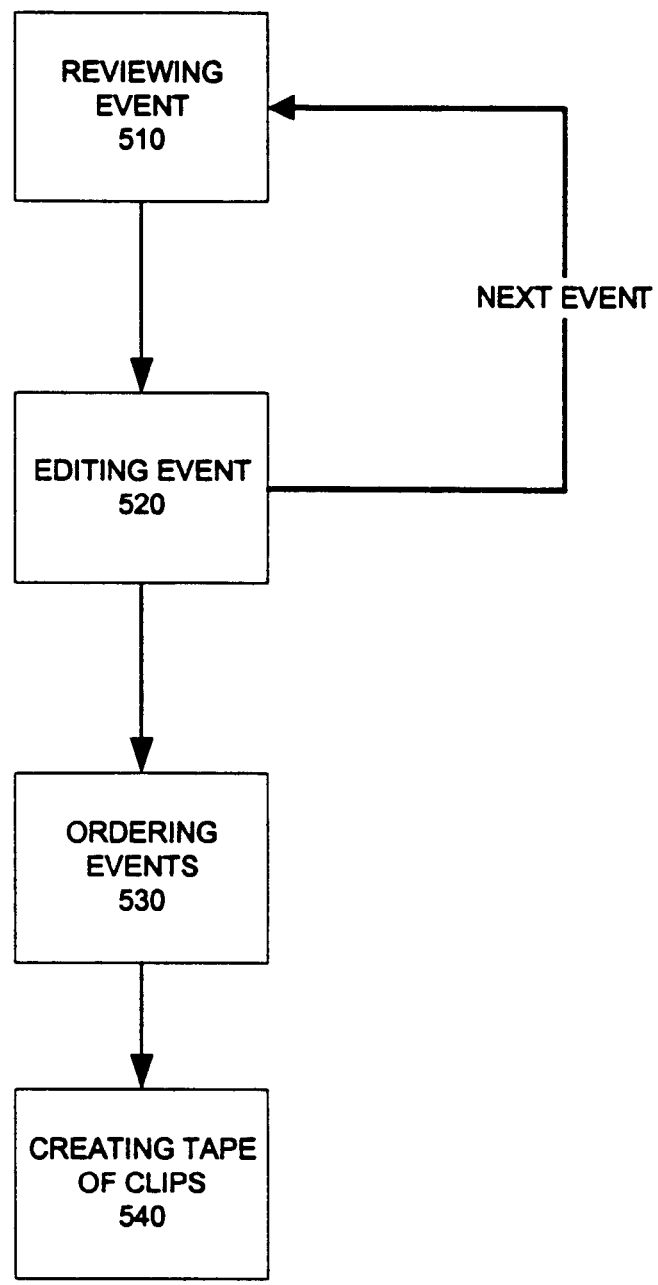
FIG. 5 is a flow diagram of the steps for creating a target recording using the system.

FIG. 5 is a flowchart of the steps for creating the target recording. In step 510, the selected clips from the source recording, and the data in the event database corresponding to each clip, are reviewed. In step 520, the event data for each clip are edited, and any additional data for each clip are entered into the database. These two steps are repeated until all of the selected events have been reviewed, edited and supplemented.

Figure 10:
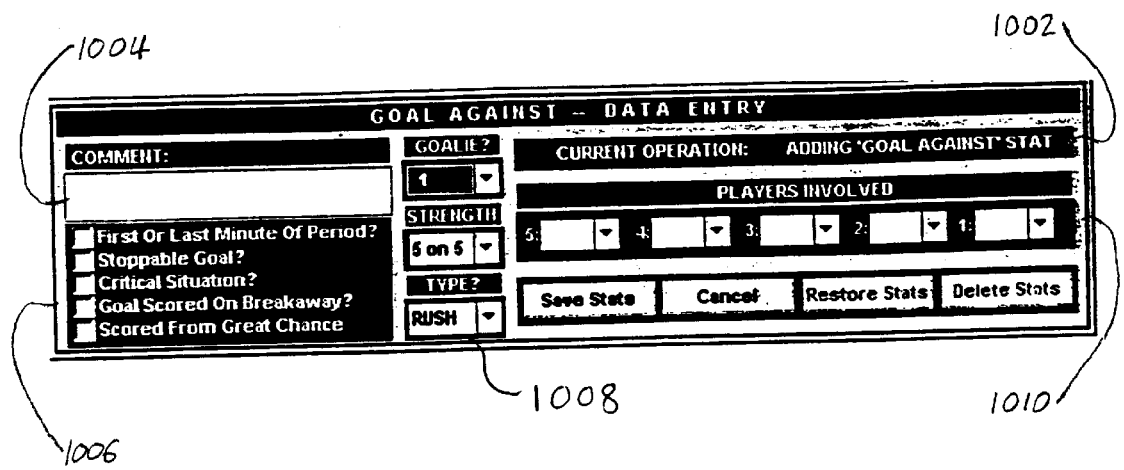
FIG. 10 is a display of a screen of the system for adding additional data for clips of a performance.

An example of a screen display for adding additional data into the database for each event for a hockey game performance is shown in FIG. 10. This screen is displayed when, e.g., the operator clicks on a particular event listed in event table 902 of FIG. 9. Current operation field 1002 displays the particular event for which the additional data are being entered, e.g., a particular goal during the performance. Comment box 1004 enables the operator to enter comments regarding the event. Data check boxes 1006 enable the operator to enter yes/no responses for the entry of specific additional data regarding the event. These data include, e.g., "first or last minute of period," "stoppable goal," "critical situation," "goal scored on breakaway," and "scored from great chance." Drop-down boxes 1008 enable the operator to enter multiple-choice responses for the entry of additional specific data regarding the event. Player drop-down boxes 1010 enable the operator to identify the players involved in the event.

Upon the completion of adding additional data for each event, the operator advances the program to step 530 where all of the clips and the associated event data are sequenced into the order in which the operator wishes the clips to appear on a target recording. The events can be ordered in different ways, such as by time or by type of event. In step 540, the recorded clips in the selected order, and selected portions of the event data corresponding to each clip, are recorded onto target video cassette tape 142.

Figure 11:
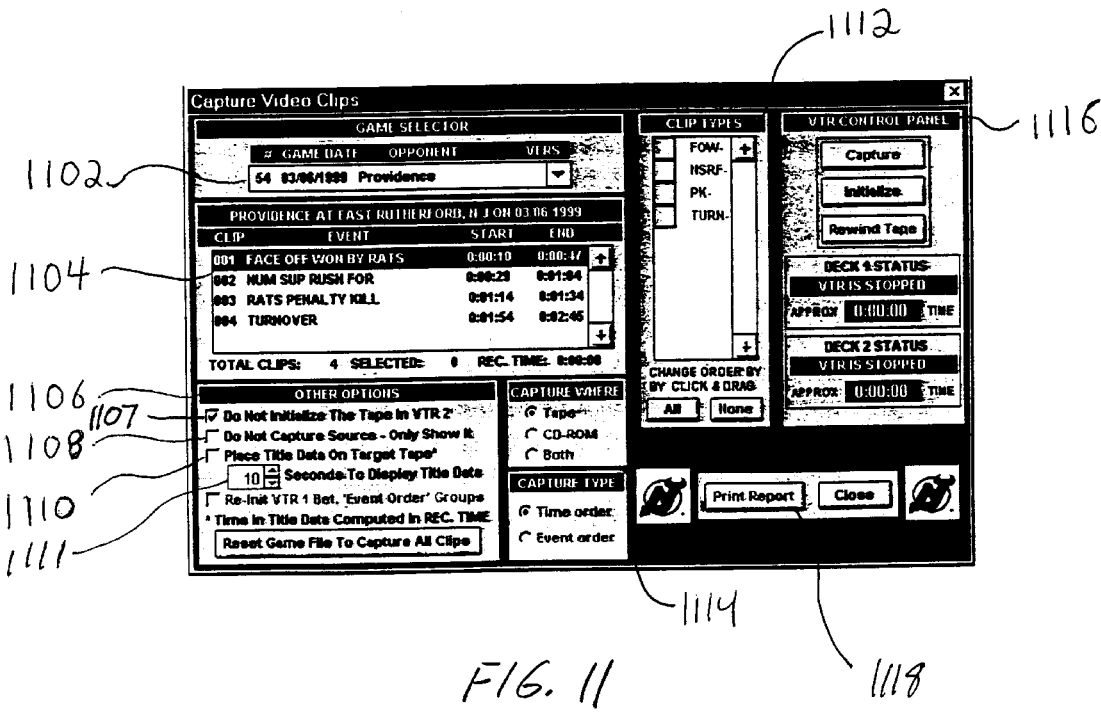
FIG. 11 is a display of a screen of the system for sequencing clips into a selected order and recording the selected sequence onto a target recording.

An example of a screen display for sequencing clips into a selected order for a hockey game performance, and recording the selected sequence of clips onto target video cassette tape 142, is shown in FIG. 11. As shown in this figure, game indicator field 1102 enables the operator to select the performance for which the ordering of clips is desired. Event clip table 1104 lists the clips identified for that performance.

Option boxes 1106 enable the operator to select various options by selecting or deselecting the boxes associated with these options. These options include box 1107 for selecting whether to initialize target video cassette tape 142, box 1108 for selecting whether to generate a target tape, box 1110 for selecting whether to place event titles on the target tape to label the clips on the tape and box 1111 for selecting the time for which a title will be displayed on the target tape before the clip is displayed.

Clip types list 1112 in FIG. 11 provides a list of shorthand notations identifying the clips appearing in event clip table 1104. By clicking and dragging on these various shorthand notations, the order of the clips recorded onto target video cassette tape 142 is selected. Capture options box 1114 enables the operator to determine the media upon which the target recording is recorded. These media include target video cassette tape 142 and a CD-ROM associated with computer 102. These options further include an option to reorder all of the clips for the performance in time order or to categorize all of the clips for the performance with respect to event type. Clip control panel 1116 enables the operator to control source VTR 126 and target VTR 130 during the recording of clips from source video cassette tape 140 to target video cassette tape 142. Print report box 1118 enables the operator to print a hard copy of the list of events recorded on target video cassette tape 142 and other information from the event database.

In an alternative embodiment, system 101 includes a hard-disk recorder in parallel with, or in place of, source VTR 126. The hard-disk recorder records digital audiovisual signals on, and plays back digital audiovisual signals from, a hard disk in compressed and encoded format, e.g., motion JPEG or other formats. The hard-disk recorder enables random access to the source video data on this hard disk as opposed to the slower serial access to the source video data on the tape employed by source VTR 126. The hard-disk recorder includes an interface for control by computer 101 and a converter for converting the recorded digital audiovisual signals to an analog format. This conversion enables the recording of a selected sequence of clips from the hard-disk recorder onto target video cassette tape 142. As discussed above, copies of this video cassette tape then can be made inexpensively for viewing by individuals using their home VCRs.

In accordance with the invention, therefore, a database is constructed in the computer's memory (e.g., the computer's hard disk) of events corresponding to the recorded clips of a performance. Each entry in the database has an associated set of statistics and an associated calibrated time index. The time index associates each of the events with the position of the clip on a recording of the performance on a video tape or other audiovisual storage media. The video tape or other storage media, and each clip on the video tape or other storage media, may include a title and other alphanumeric information.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of using a computer for creating video clips of activities occurring during a performance, and creating a corresponding database associated with said computer of information relating to said video clips, comprising:

playing on a playback device a first video recording of said performance;

establishing in said database for recognition by said computer a plurality of pre-defined events, each of said pre-defined events corresponding to one of a plurality of activities that may occur during said performance;

assigning user-selectable indicia to each of said pre-defined events;

upon the occurrence of a first activity of said plurality of activities during said performance, selecting the user-selectable indicia corresponding to said first activity;

storing in said database, in response to said selecting, first data identifying the event corresponding to said first activity;

storing in said database, in response to said selecting, second data identifying a first segment of said first video recording where said first activity is recorded and a pre-determined starting point and ending point of said first segment;

using a recording device, copying said first segment from said first video recording onto a second video recording.

2. The method of claim 1, wherein said performance is a game.

3. The method of claim 1, wherein said playback device comprises an analog video tape recorder and said first video recording is an analog tape.

4. The method of claim 1, wherein said playback device comprises a digital recorder and said first video recording is a digital recording.

5. The method of claim 1, further comprising displaying said performance on a video monitor during said playing.

6. The method of claim 1, further comprising displaying said user-selectable indicia corresponding to each of said pre-defined events on a monitor associated with said computer and selecting the user-selectable indicia corresponding to said first activity by clicking on said indicia corresponding to said first activity using a mouse associated with said computer.

7. The method of claim 1, further comprising displaying said user-selectable indicia on the keys of a keyboard associated with said computer and selecting the user-selectable indicia corresponding to said first activity by pressing the key of said keyboard displaying the indicia corresponding to said first activity.

8. The method of claim 1, further comprising storing in said database third data identifying a second segment of said first video recording where a second activity of said plurality of activities is recorded and a pre-determined starting point and ending point of said second segment;

storing in said database fourth data identifying a third segment of said first video recording where a third activity of said plurality of activities is recorded and a pre-determined starting point and ending point of said third segment;

prior to said copying, using said computer to arrange said first segment, said second segment and said third segment into a desired sequence of video clips; and using said recording device, copying said first segment, said second segment and said third segment from said first video recording onto said second video recording in said desired sequence.

9. The method of claim 1, further comprising transmitting a plurality of control signals from said computer to control said playback device.

10. The method of claim 9, further comprising displaying a plurality of user-selectable control buttons on a monitor associated with said computer, assigning one of said control buttons to each of said control signals and, upon selecting a first control button of said plurality of control buttons, transmitting to said playback device the control signal corresponding to said first control button.

11. The method of claim 1, further comprising recording alphanumeric data from said database onto said second video recording.

12. The method of claim 11, wherein said alphanumeric data comprises a title for the event corresponding to the first activity.

13. The method of claim 12, wherein said alphanumeric data comprises the names of individuals involved in the first activity.

14. The method of claim 13, wherein said performance is a game and said names comprise the names of players in said game.

15. The method of claim 1, further comprising modifying said second data with respect to said pre-determined starting point or said pre-determined ending point prior to said copying.

16. The method of claim 1, further comprising entering into said database information regarding said performance.

17. The method of claim 16, wherein said performance is a game and said information comprises the names of the players and teams participating in said game.

18. The method of claim 17, wherein said first data further identifies the players involved in said first activity.

19. The method of claim 1, wherein said establishing further comprises assigning a pre-determined recording time to each of said pre-defined events.

20. A system for creating video clips of activities occurring during a performance, and creating a corresponding database associated with a computer of information relating to said video clips, comprising:
   a playback device for playing a first video recording of said performance;
   means for establishing in said database for recognition by said computer a plurality of pre-defined events, each of said pre-defined events corresponding to one of a plurality of activities that may occur during said performance;
   means for assigning user-selectable indicia to each of said pre-defined events;
   means for selecting the user-selectable indicia corresponding to a first activity of said plurality of activities upon the occurrence of said first activity during said performance;
   means for storing in said database, in response to said selecting, first data identifying the event corresponding to said first activity;
   means for storing in said database, in response to said selecting, second data identifying a first segment of said first video recording where said first activity is recorded and a pre-determined starting point and ending point of said first segment;
   a recording device for copying said first segment from said first video recording onto a second video recording.

21. The system of claim 20, wherein said performance is a game.

22. The system of claim 20, wherein said playback device comprises an analog video tape recorder and said first video recording is an analog tape.

23. The system of claim 20, wherein said playback device comprises a digital recorder and said first video recording is a digital recording.

24. The system of claim 20, further comprising a video monitor for displaying said performance during said playing.

25. The system of claim 20, further comprising a monitor associated with said computer for displaying said user-selectable indicia corresponding to each of said pre-defined events and a mouse associated with said computer for selecting the user-selectable indicia corresponding to said first activity by clicking on said indicia corresponding to said first activity.

26. The system of claim 20, further comprising a keyboard associated with said computer for displaying said user-selectable indicia on the keys of said keyboard and for selecting the user-selectable indicia corresponding to said first activity by pressing the key of said keyboard displaying the indicia corresponding to said first activity.

27. The system of claim 20, further comprising means for storing in said database third data identifying a second segment of said first video recording where a second activity of said plurality of activities is recorded and a pre-determined starting point and ending point of said second segment;
   means for storing in said database fourth data identifying a third segment of said first video recording where a third activity of said plurality of activities is recorded and a pre-determined starting point and ending point of said third segment;
   means for using said computer to arrange said first segment, said second segment and said third segment into a desired sequence of video clips prior to said copying; and
   means for using said recording device to copy said first segment, said second segment and said third segment from said first video recording onto said second video recording in said desired sequence.

28. The system of claim 20, further comprising means for transmitting a plurality of control signals from said computer to control said playback device.

29. The system of claim 28, further comprising a monitor associated with said computer for displaying a plurality of user-selectable control buttons, means for assigning one of said control buttons to each of said control signals and means for transmitting to said playback device the control signal corresponding to a first control button of said plurality of control buttons upon selecting said first control button.

30. The system of claim 20, further comprising means for recording alphanumeric data from said database onto said second video recording.

31. The system of claim 30, wherein said alphanumeric data comprises a title for the event corresponding to the first activity.

32. The system of claim 31, wherein said alphanumeric data comprises the names of individuals involved in said first activity.

33. The system of claim 32, wherein said performance is a game and said names comprise the names of players in said game.

34. The system of claim 20, further comprising means for modifying said second data with respect to said predetermined starting point or said pre-determined ending point prior to said copying.

35. The system of claim 20, further comprising means for entering into said database information regarding said performance.

36. The system of claim 35, wherein said performance is a game and said information comprises the names of the players and teams participating in said game.

37. The system of claim 36, wherein said first data further identifies the players involved in said first activity.

38. The system of claim 20, wherein said means for establishing further comprises means for assigning a pre-determined recording time to each of said pre-defined events.

39. The system of claim 22, further comprising means for compensating for variances in the speed of playing of said analog tape by said analog video tape recorder in determining said pre-determined starting point and ending point of said first segment.

40. A method of using a computer for creating video clips of activities occurring during a live performance, and creating a corresponding database associated with said computer of information relating to said video clips, comprising:

preparing with a first recording device a first video recording of said live performance;

establishing in said database for recognition by said computer a plurality of pre-defined events, each of said pre-defined events corresponding to one of a plurality of activities that may occur during said live performance;

assigning user-selectable indicia to each of said pre-defined events;

upon the occurrence of a first activity of said plurality of activities during said live performance, selecting the user-selectable indicia corresponding to said first activity;

storing in said database, in response to said selecting, first data identifying the event corresponding to said first activity;

storing in said database, in response to said selecting, second data identifying a first segment of said first video recording where said first activity is recorded and a pre-determined starting point and ending point of said first segment;

using a second recording device, copying said first segment from said first video recording onto a second video recording.

41. The method of claim 40, wherein said live performance is a game.

42. The method of claim 40, wherein said first recording device and said second recording device are analog video tape recorders and said first video recording and said second video recording are analog tapes.

43. The method of claim 40, wherein said first recording device is a digital recorder, said first video recording is a digital recording, said second recording device is an analog video tape recorder and said second video recording is an analog tape.

44. The method of claim 40, further comprising displaying said live performance on a video monitor during said playing.

45. A system for creating video clips of activities occurring during a performance, comprising:

a computer;

a first video recorder for playing a first video recording of said performance;

a first video-computer interface for controlling said first video recorder in response to first control signals form said computer;

a second video recorder for preparing a second video recording of selected segments of said first video recording;

a second video-computer interface for controlling said second video recorder in response to second control signals from said computer;

a video monitor for displaying said performance in response to video signals from said first video recorder;

a computer input device for displaying a plurality of user-selectable icons and for transmitting a signal to said computer in response to a user's selection of each of said icons, each of said user-selectable icons corresponding to one of a plurality of pre-defined events and each of said pre-defined events corresponding to one of a plurality of activities that may occur during said performance; and a memory associated with said computer for storing first data identifying the pre-defined events selected by said user for said performance and second data identifying the locations on said first video recording where said selected events are recorded.

46. The system of claim 45, wherein said first video recorder is an analog video tape recorder and said first video recording is an analog tape.

47. The system of claim 46, wherein said second video recorder is an analog video tape recorder and said second video recording is an analog tape.

48. The system of claim 47, wherein said first video recorder is a digital recorder and said first video recording is a digital recording.

49. The system of claim 48, wherein said second video recorder is an analog video tape recorder and said second video recording is an analog tape.

50. The system of claim 45, wherein said computer input device comprises a keyboard associated with said computer and said plurality of user-selectable icons are displayed on the keys of said keyboard.

51. The system of claim 45, wherein said computer input device comprises a monitor and mouse, said monitor and mouse being associated with said computer, and said plurality of user-selectable icons are displayed on said monitor for selection using said mouse.

52. The system of claim 51, wherein said monitor further displays a plurality of user-selectable buttons for selection using said mouse, each of said buttons being associated with, and for activation of, one of said first control signals or said second control signals.

* * * * *